C. E. HARRIS.
VEHICLE WHEEL.
APPLICATION FILED JULY 2, 1907.
910,193.
Patented Jan. 19, 1909.
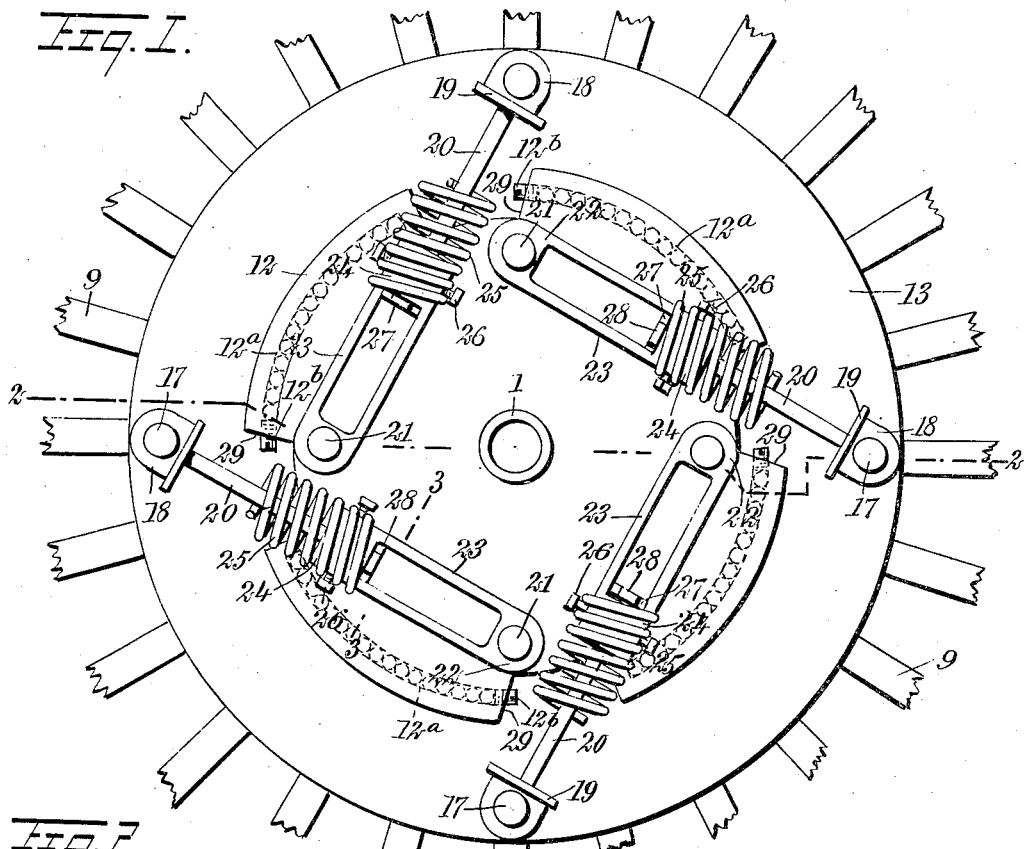
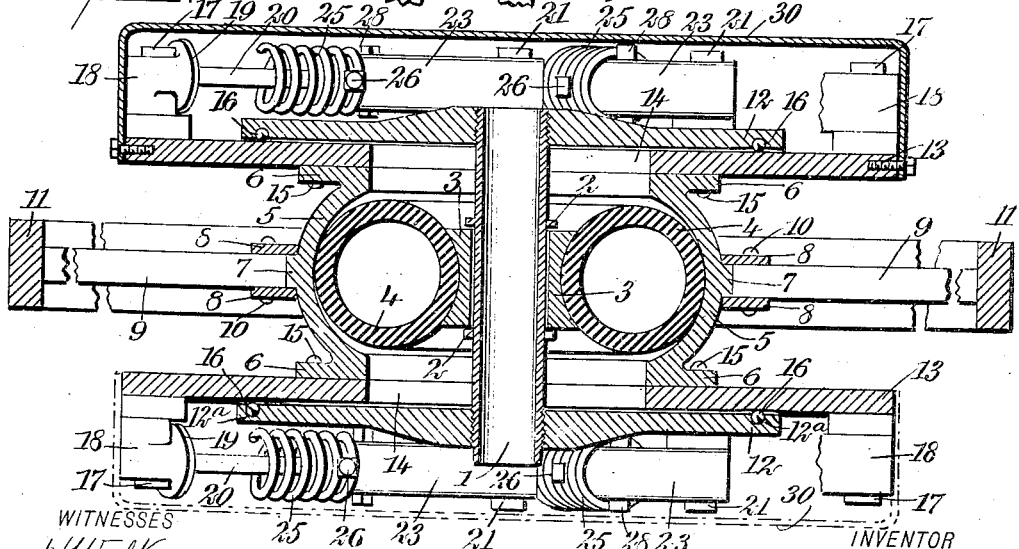
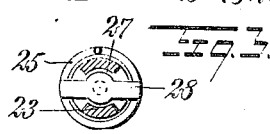
WITNESSES
L. Walker
John K. Blackwood
INVENTOR
Claude E. Harris
BY Munn & Co.
ATTORNEYS

UNITED STATES PATENT OFFICE.

CLAUDE EDELBERT HARRIS, OF CARBONDALE, COLORADO.

VEHICLE-WHEEL.

No. 910,193.    Specification of Letters Patent.    Patented Jan. 19, 1909.

Application filed July 2, 1907. Serial No. 381,844.

*To all whom it may concern:*

Be it known that I, CLAUDE E. HARRIS, a citizen of the United States, and a resident of Carbondale, in the county of Garfield and State of Colorado, have invented a new and Improved Vehicle-Wheel, of which the following is a full, clear, and exact description.

This invention relates to vehicle wheels and more particularly to that class of wheels known as resilient or spring-wheels.

The object of the invention is to provide a simple, strong and durable vehicle wheel having resilient means for absorbing radial and tangential shocks.

A further object of the invention is to provide a vehicle wheel having a hub, around the hub a spaced spoke-ring, and intermediate the hub and the ring a pneumatic or cushion shock absorber.

A still further object of the invention is to provide a vehicle wheel having a hub, a spaced spoke-ring, a cushion member between the hub and the spoke-ring, and adjacent movable members rigid respectively with the hub and the ring, the movable members having ball-bearings therebetween and being connected by telescoping links provided with springs for resisting the movement of one member relatively to the other.

The invention consists in the construction and combination of parts to be more fully described hereinafter and particularly set forth in the claims.

Reference is to be had to the accompanying drawings forming part of this specification, in which similar characters of reference indicate corresponding parts in all the views, and in which—

Figure 1 is a side elevation of a vehicle wheel having the spokes broken away, and showing my invention applied to the wheel; Fig. 2 is a transverse section on the line 2—2 of Fig. 1; and Fig. 3 is a similar section on the line 3—3 of Fig. 1.

Before proceeding to a more detailed explanation of my invention it should be understood that in certain classes of vehicle wheels, particularly those used in connection with automobiles, it is necessary to provide pneumatic or other tires to absorb the shock incident to the travel of the vehicle. Suitable tires of pneumatic or other type are frequently unreliable, and wear out rapidly, and thus are a source of trouble and expense. To avoid these difficulties I provide a vehicle wheel in which the shocks are absorbed at the hub of the wheel, and in which the felly is provided with any ordinary tire, such as a metal rim. Shocks or concussions affect a vehicle wheel radially along the spokes, and tangentially; in the latter case, for instance, when a vehicle is suddenly started or stopped. For this reason I provide a pneumatic or other cushion member between the hub, mounted upon the axle, and the ring carrying the spokes, so that radial shocks are absorbed by the annular tire surrounding the hub itself. The tire may be of a tubular or pneumatic form, or it may consist of a solid rubber ring or any other resilient body suited to the purpose. The hub and the spoke-ring are relatively movable and each has rigid members at opposite sides of the wheel; the adjacent members, are of course, relatively movable and have ball-bearings at the contiguous faces to decrease the friction and facilitate the relative movement. The adjacent members are connected by pivoted telescoping links which operate in a direction intermediate of a radius and the tangent to the radius, so that the links will telescope under the influence of tangential shock. The links have springs which, after a certain predetermined movement of the telescoping links, become operative to resist a further movement of the members, and thereby increase the resiliency of the wheel.

Referring more particularly to the drawings, 1 represents a hub, preferably tubular in form and adapted to be mounted upon axle journals in the usual manner. Near the center, the hub has spaced annular projections 2 between which is loosely mounted an annular supporting member 3 having its outer circumferential face concave. An annular and tubular resilient cushion-member 4 is mounted upon the member 3 and engages the concave face of the latter. The cushion-member may be of any common or preferred form, such as a solid ring of rubber, or a circular spring. A spoke-ring 5 is carried around the hub 1 and has an outwardly concaved wall which engages the resilient member 4 as appears most clearly in Fig. 2. At the edges, the ring has laterally disposed flanges 6 the planes of which are substantially perpendicular to the axis of the hub. At the center, between the flanges 6, the spoke-ring has an annular projection 7 at the sides of which are arranged rings 8. The spokes 9 have the inner ends abutting against the projection 7 and are secured in position between the rings 8 by means of bolts or rivets 10. At the outer ends, the spokes carry the usual felly 11.

The extremities of the hub 1 are threaded and each carries a correspondingly threaded disk-member 12 having a central opening which is screwed upon the threaded end of the hub, the disk being carried thereby. An annular disk-member 13 having a central opening 14 about the hub, is rigidly mounted on each flange 6 of the spoke-ring by means of bolts or rivets 15. The members 12 and 13 at each side of the wheel lie adjacent and are relatively movable. The members 12 at the faces adjacent to the members 13 have ball-bearing raceways 12$^a$, in which are located ball-bearings 16, projecting slightly beyond the surface of the member 12. The adjacent faces of the members 13 rest against the bearings 16, whereby the relative movement of the members 12 and 13 is facilitated. The bearings are held in the raceways by set screws 12$^b$. Near the rim, each of the members 13 has a plurality of laterally extending pivot pins 17 having enlarged base portions 17$^a$ and upon which are pivotally mounted suitable blocks 18, presenting shoulders 19 and having rigid therewith rods 20. Each of the members 12 near the rim has a plurality of pivot pins 21, upon each of which is pivotally mounted the crown 22 of a stirrup 23. At the opposite end, each stirrup has a base 24 which carries the end of a helical spring 25 rigidly secured in position by means of screws 26. The spring is arranged upon the rod 20 and the end remote from the base is free. The rod 20 passes through a suitable opening in the base and extends into the stirrup between the opposite sides thereof, having a head 27 provided with lateral extensions 28. The head 27 is adapted to engage the ends of the stirrup and limits the movement of the rod relatively to the latter. Each of the members 12 is provided with a plurality of peripheral recesses 29 adjacent to the pins 17 of the member 13 when the members are in the normal relative position. The sides of the stirrup are curved and the head 27 which is similarly curved is arranged to slide smoothly between the sides of the stirrup, the extensions 28 projecting laterally between the sides of the stirrups and serving as guides.

By means of the telescoping links formed by the stirrups and rods, the members 12 and 13 are operatively connected. The movement of the spoke-ring relative to the hub is thus resisted and limited by the links. The latter are preferably four in number and the adjacent links are arranged substantially at right-angles with the other. The springs 25 engage the shoulders 19 of the blocks 18, when the links have been telescoped a certain distance corresponding to the distance between the end of the spring and the shoulders when the links are in normal position, that is, when the spoke-ring is arranged concentrically about the hub. Thus the members have a certain relative movement which is unresisted, and this movement in itself acts as a shock absorber for slighter shocks in connection with the resilient member between the hub and the spoke-ring. When a link is telescoped a certain distance, the free end of the spring 25 engages the shoulder of the block 18 and resists the relative movement of the parts. The recesses 29 at the periphery of the disk-member 12 are for the purpose of permitting the movement of the latter without engaging the base portions 17$^a$ of the pins 17. The angular positions of the telescoping links and the relative arrangement of the same is such that shocks in any direction in the plane of the wheel will affect the links, certain of which are telescoped thereby while the opposite links are extended. In this way tangential shocks, radial shocks and shocks in an intermediate direction, are fully and completely absorbed either by the telescoping links and the springs, by the resilient member between the hub and the spoke-ring, or by both, acting in conjunction.

The telescoping members at each side of the wheel are preferably incased by a cover 30 having a laterally disposed annular flange carried at the edge of a member 13. The cover 30 protects the telescoping links and the members 12 and 13 together with the bearings therebetween, from dust and dirt. The cover at the inner side of the wheel will of course be provided with a central opening to permit the axle to pass therethrough into the hub 1.

Having thus described my invention I claim as new, and desire to secure by Letters Patent:—

1. In a vehicle wheel, a hub, a spoke-ring around said hub, a cushion between said hub and said ring, relatively movable members rigid respectively with said hub and said ring, a link connecting said members, and means for resisting the relative movement of said members, said last means becoming operative after said members have assumed predetermined relative positions.

2. In a vehicle wheel, a hub, a spoke-ring around said hub, a cushion between said hub and said ring, relatively movable members rigid respectively with said hub and said ring, and a telescoping link connecting said members and having means for resisting the relative movement of said members, said members becoming operative after said link is telescoped to a predetermined point.

3. In a vehicle wheel, a hub, a spoke-ring around said hub, a cushion between said hub and said ring, relatively movable members rigid respectively with said hub and said ring, and a plurality of telescoping links having means for resisting the relative movement of said members after said links have telescoped a predetermined distance.

4. In a vehicle wheel, a hub, a spoke-ring around said hub, a cushion between said hub and said ring, relatively movable members rigid respectively with said hub and said ring, a plurality of links connecting said members, the links of each adjacent pair being at substantially right-angles, and having means for resisting the relative movement of said members, said means being inoperative when said links are in a normal position.

5. In a vehicle wheel, a hub, a spoke-ring around said hub, a cushion between said hub and said ring, relatively movable members rigid respectively with said hub and said ring, a plurality of telescoping links connecting said members, means for resisting the relative movement of said members, and means for limiting the telescoping of said links, said resisting means being normally inoperative and becoming operative when said links have telescoped to a predetermined extent.

6. In a vehicle wheel, a hub, a spoke-ring around said hub, a cushion between said hub and said ring, relatively movable members rigid respectively with said hub and said ring, a plurality of telescoping links connecting said members, the links of each adjacent pair being at substantially right-angles, and means on said links for resisting the relative movement of said members, and for limiting the telescoping thereof, said resisting means being normally inoperative and becoming operative when said links have telescoped to a predetermined extent.

7. In a vehicle wheel, a hub, a spoke-ring around said hub, a cushion between said hub and said ring, relatively movable members rigid respectively with said hub and said ring, a plurality of telescoping links pivotally mounted at opposite ends upon said members respectively, and means for resisting the relative movement of said members, said links being free to telescope to a predetermined extent.

8. In a vehicle wheel, a hub, a spoke-ring around said hub, a cushion between said hub and said ring, relatively movable members rigid respectively with said hub and said ring, a plurality of telescoping links having the opposite ends pivotally mounted respectively upon said members, the links of each adjacent pair being at substantially right-angles, springs for resisting the telescoping of said links, stops on said links for limiting the telescoping of said links, and ball-bearings between said members, one of said members having cut-away portions adjacent to the points of attachment of said links to the other of said members.

9. In a vehicle wheel, a hub, a spoke-ring around said hub, a cushion between said hub and said ring, a member rigid with said hub, a second member rigid with said ring, pivot pins carried by said members, a stirrup pivotally mounted upon said pivot pin of said first member, a rod pivotally mounted upon said pivot pin of said second member, said rod being arranged to telescope within said stirrup and having a head slidably located between the sides of said stirrup, a spring secured at one end upon said stirrup and extending longitudinally of said rod, said rod having a shoulder adapted to engage said spring when said rod is telescoped within said stirrup.

10. In a vehicle wheel, a hub, a spoke-ring around said hub, a cushion between said hub and said ring, a member rigid with said hub, a second member rigid with said ring, pivot pins carried by said members, a stirrup pivotally mounted upon said pivot pin of said first member, a rod pivotally mounted upon said pivot pin of said second member, said rod being arranged to telescope within said stirrup and having a head slidably located between the sides of said stirrup, a spring secured at one end upon said stirrup and extending longitudinally of said rod, said rod having a shoulder adapted to engage said spring when said rod is telescoped within said stirrup, said first member having peripheral recesses adjacent to said pivot pins of said second member, and ball-bearings between said members.

11. In a vehicle wheel, a hub, a spoke-ring around said hub, a cushion between said hub and said ring, relatively movable members rigid respectively with said hub and said ring, a telescoping link connecting said members, the longitudinal direction of said link being intermediate a radius of said wheel and the tangent at said radius, and means for resisting the relative movement of said members, said means being normally inoperative and engaging said link to become operative when said link has telescoped to a predetermined extent.

In testimony whereof I have signed my name to this specification in the presence of two subscribing witnesses.

CLAUDE EDELBERT HARRIS.

Witnesses:
WM. PAULEY,
S. H. GRAVES.